Feb. 23, 1971 — J. H. ARFF — 3,565,776
GENERATOR FOR PRODUCING ALLOTROPIC OXYGEN
Filed Sept. 26, 1968 — 2 Sheets-Sheet 1
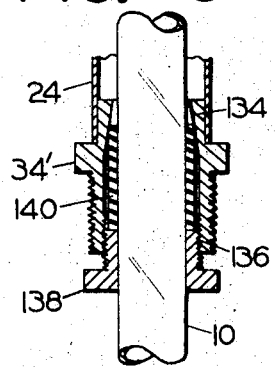
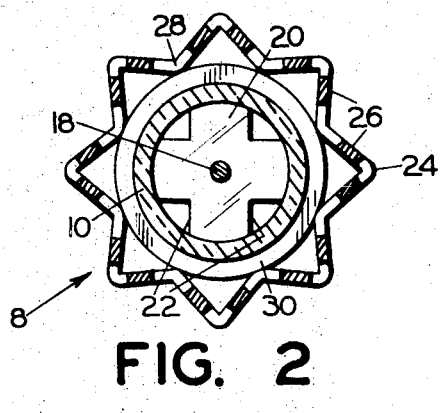
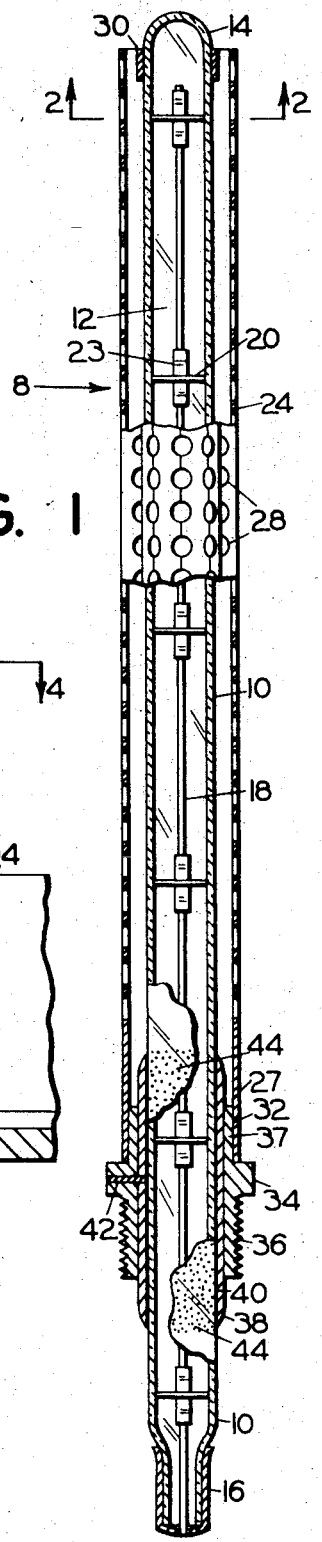
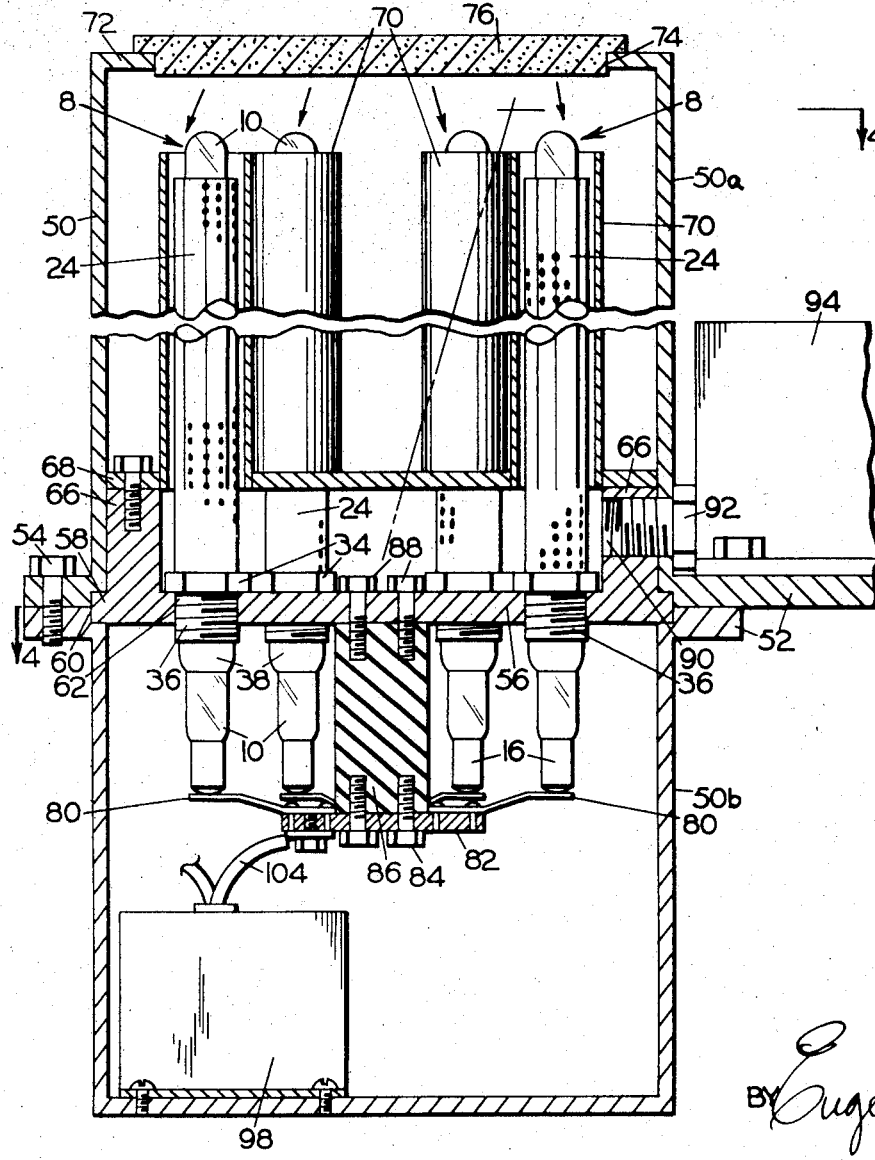
JOHN H. ARFF
INVENTOR.
BY Eugene M. Eckelman
ATTY.

Feb. 23, 1971 J. H. ARFF 3,565,776
GENERATOR FOR PRODUCING ALLOTROPIC OXYGEN
Filed Sept. 26, 1968 2 Sheets-Sheet 2
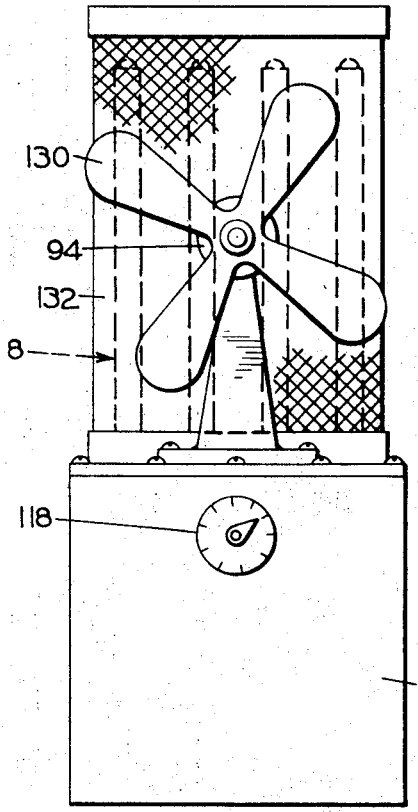
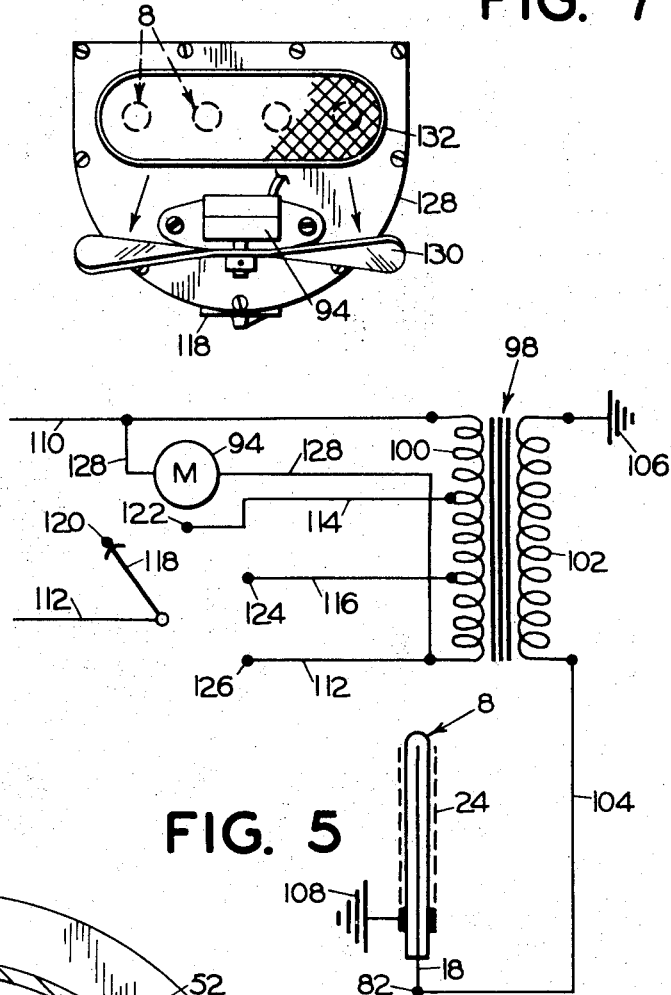
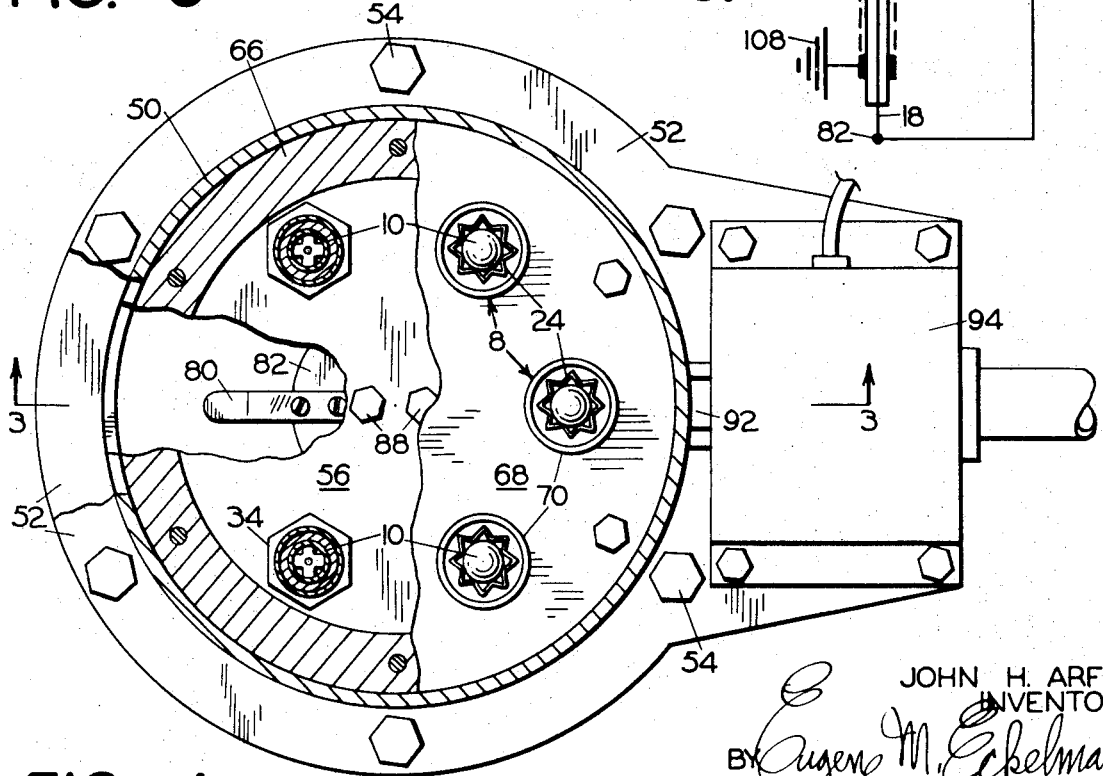
JOHN H. ARFF
INVENTOR.
BY Eugene M. Eckelman
ATTY.

United States Patent Office 3,565,776
Patented Feb. 23, 1971

3,565,776
GENERATOR FOR PRODUCING ALLOTROPIC OXYGEN
John H. Arff, 118 NE. 24th Ave., Portland, Oreg. 97232
Filed Sept. 26, 1968, Ser. No. 762,708
Int. Cl. C01b *13/12*
U.S. Cl. 204—320
4 Claims

ABSTRACT OF THE DISCLOSURE

Apparatus for producing allotropic oxygen or ozone including a tube having a gaseous filling which when subjected to high voltage in the tube is capable of producing a radiation of energy through the tube. An encircling perforated grid is provided on the tube and energy radiated from the tube sets upon an inductance with the grid to produce allotropic oxygen. An electrode extends substantially the full length of the tube whereby the radiation of energy occurs throughout substantially the entire length of the tube. A plurality of the tubes are mounted in a support housing for multiple output. The housing has a horizontal support wall for the tubes providing easy attachment and detachment thereof. The tubes are enclosed within the housing and the inlet for air forced therethrough is filtered to maintain the tubes in a substantially dust free enclosure.

---

The invention relates to new and useful improvements in generators for producing allotropic oxygen of the type illustrated in my Pat. No. 2,326,601.

A binary objective of the present invention is to provide a generator for producing allotropic oxygen which includes a gas filled glass tube capable of producing alloptropic oxygen and having a novel structure wherein an elongated electrical conductor for subjecting the gas filling to a high voltage extends substantially the full length of the tube so that the tube operates substantially uniformly throughout its entire length.

Another object is to provide a support housing for a plurality of such tubes which includes novel support means facilitating easy inserting and removal of the tubes and also providing for a filtered flow of air around the tubes to withdraw the allotropic oxygen generated thereby as well as to facilitate cleaning of the tubes and grids.

Another object of the present invention is to provide an electrical control system for controlling the output of the tubes and providing a novel arrangement of the control system wherein the speed of a blower for withdrawing allotropic oxygen from around the tubes is controlled automatically in relation to the output of the tubes.

Still another object is to provide a gas filled tube employing a novel connection between the tube and an electrically conductive support collar.

The invention will be better understood and additional objects and advantages will become apparent from the following description taken in connection with the accompanying drawings which illustrate a preferred form of the device.

BRIEF DESCRIPTION OF THE DRAWINGS

FIG. 1 is an elevational view of a tube forming a part of the present invention, portions of such tube being broken away to show internal structure thereof;

FIG. 2 is an enlarged cross sectional view of the tube taken on the line 2—2 of FIG. 1;

FIG. 3 is a cross sectional view of a support housing for a plurality of the tubes, the view being taken on the line 3—3 of FIG. 4;

FIG. 4 is a cross sectional view taken on the line 4—4 of FIG. 3, this view being broken away for clarity;

FIG. 5 is a wiring diagram of control means employed with the present invention;

FIG. 6 is a front elevational view of a modified form of tube support housing;

FIG. 7 is a top plan view of the housing of FIG. 5; and

FIG. 8 is a fragmentary sectional view of the tube adjacent the support end showing a modified form of connection between said tube and a support collar.

DETAILED DESCRIPTION OF PREFERRED EMBODIMENT

With particular reference to the drawings and first to FIGS. 1 and 2, a tube assembly 8 is employed which includes a glass tube 10 having a gas filled interior 12. Tube 10 is closed at one end 14 by a continuation of the glass and is closed at the other end by an electrically conductive socket type contact 16. Integrated with the socket 16 is a wire type conductor 18 which extends from said contact through substantially the entire length of the tube. Such conductor is held centered in the tube by non-conductive discs 20, such as mica discs, which have cut-out portions 22 allowing free movement of gas when excited lengthwise of the tube 10. Mica discs 22 are integrated with tubular holders 23 for secure positioning in the tube, the holders 23 receiving the wire 18 in a substantially tight fit in order that they will remain where set.

Mounted on the tube 10 is a perforated grid 24 electrically conductive material such as stainless steel, and as seen in FIG. 2, such grid has V-shaped flutes 26 extending longitudinally thereof. These flutes terminate short of the inner end of the grid whereby a portion 27 of the latter is round. The perforations are designated by the numeral 28 and are provided in the outermost edges of the flutes and in the bottom thereof. The grid has an internal insulating ring 30 at the outer end of the tube which fits snugly within the grid and snugly on the tube for supporting the outer end of the grid on the tube.

The mounted support of the grid 24 at the inner end of the tube comprises a collar 32 having a hex head portion 34 intermediate its ends. The inner end 36 of the collar is threaded and forms a male extension for engagement in a mounting socket to be described hereinafter. The outer end 37 of the collar is smooth surfaced and the inner end 27 of the grid fits snugly thereon.

To provide an attachment of the collar 32 on the tube which is substantially permanent and which also allows for expansion and contraction of the tube as it warms and cools, collar 32 is secured on a sleeve 38 of a plastic or other material having the characteristics of being semi-hard but also having the characteristics of being sufficiently resilient to provide some cushion laterally for taking up some of the expansion and contraction of the tube and also to absorb mechanical shock occurring on the collar 32. Many present day plastics possess the characteristics named, one of which is known in the trade as "Lucite," as well as being electrically insulative.

Although some of the expansion and contraction of the tube is taken up by the sleeve 38, as well as mechanical shock, the main portion of the expansion and contraction is taken up by a bonding layer 40 of plastic, shown in FIG. 1 as a solid black line, disposed between the tube and the interior of sleeve 38. Here again, many materials are available which accomplish good bonding between the glass and the plastic sleeve 38 and at the same time have enough resilience to allow for expansion and contraction of the tube. An epoxy plastic has been found to be very satisfactory.

In the process for mounting the collar 32 on the tube, the said collar 32 is first bonded to the sleeve 38. The sleeve has an interior diameter slightly greater than, for example, one thirty-second of an inch, the exterior diameter of the tube, to provide space for the bonding layer 40. The collar 32 and the sleeve 38 have a radial aperture 42 therethrough and for attaching the sleeve on the tube it is preferred to melt the bonding agent 40 and after the sleeve is properly positioned on the tube the bonding agent is forced through the aperture 42. This fills the space between the sleeve and the tube and by using an adequate pressure in inserting the liquid bonding agent a thorough and uniform distribution thereof is made around the tube. A portion 44 of the tube which is to be encompassed by the sleeve 38 is roughened, such as by sand blasting of the glass tube, to form a good bonding surface for the bonding agent 40.

The inner end portion 37 of the collar 32 forms a support for the adjacent end of the grid, the opposite end of the grid being supported on the tube by insulating ring 30.

As is well known in the art and as illustrated by applicant's Patent No. 2,326,601, when a high voltage is applied to the interior of the tube the gas, such as helium and argon, within the tube is excited to the extent that energy radiates through the tube. Such radiating energy forms an inductive action with the grid 24 to produce allotropic oxygen. Since the grid 24 is perforated, it facilitates the flow of air therethrough, thus offering the least amount of resistance for the escape of the allotropic oxygen and preventing said oxygen from being further charged by being confined between the grid and the tube. The grid 24 is electrically conductive and so is the collar 32 whereby the grid can be grounded through a mounting support for the tube as will be more apparent hereinafter. Since the tube and grid form a condenser some dirt may be attracted. Any dirt, however, will adhere to the tube and only in the hole area of the grid. This deposit of dirt does not destroy the condenser action and will not burn the micron size dirt to cause other by-products.

An important feature of the present tube is the conductor 18 which produces full length output of the tube. Also forming a part of the present invention is a support housing for a plurality of the tubes. A first embodiment of housing is designated by the numeral 50. FIGS. 3 and 4, and such housing has upper and lower parts 50a and 50b removably secured together by radial flanges 52 and fastening screws 54. Supported interiorly of the housing is a horizontal wall 56 having a peripheral flange 58 engageable in a groove 60 at the joint between the two housing parts, such structure providing easy assembly and disassembly of the parts. Wall 56 has a plurality of tapped bores 62 for threaded engagement of the collar portion 36 of the tubes, and also has an upstanding peripheral flange 66 to which is attached a horizontal plate 68. Plate 68 supports a plurality of imperforate tubular housings 70 open at the ends and arranged above respective bores 62 in wall 56 so as to receive the tubes 8 supported on the wall 56. The imperforate housings 70 are somewhat larger than the overall diameter of the tube assembly 8 so as to provide an air circulation area between the housings and the tubes. Housing 50 has a top wall 72 provided with an opening 74. A removable filter 76 closes the opening 74.

The contact ends 16 of the tubes 10 project downwardly into the housing portion 50b and engage finger type contacts 80 riveted or otherwise secured to an electrically conductive plate 82 secured, as by screws 84, to a support block 86 secured as by means of screws 88 to the wall 56. Spring fingers 80 are constructed so as normally to flex upwardly beyond their engaged position by the contacts 16 of the tubes 10 in order that the contacts 16 will firmly engage said fingers and provide a good electrical contact therewith when installed in the bores 62. Further elements of the electrical system and control means will be described hereinafter.

A side discharge opening 90 is provided in the upstanding flange 66 of the wall 56, and this outlet receives a hollow fitting 92 for a pump 94 arranged to draw air through the opening 74 in the housing and discharge it to a desired place. Such flow of air moves through the filter 76 and down through the imperforate tubes to draw off the allotropic oxygen produced by the tube assemblies 8, such flow moving laterally after passing over the tubes through the space between the wall 56 and plate 68. By means of this construction the bottom portion 50b of the housing can be completely sealed from the upper portion 50a of the housing and no foreign particles can get into such lower housing portion. The pump 94 is associated with conduit means or the like, not shown, for supplying the allotropic oxygen to the desired place.

A transformer 98 is mounted in the bottom portion 50b of the housing. With reference to the wiring diagram of FIG. 5, the transformer has a primary 100 and a secondary 102. The secondary is connected at one end to the plate 82 by a wire 104 and is grounded at 106, such as to the frame at its other end. Tubes 8 are grounded at 108 through their mounting connection to the conductive wall 56. The primary 100 is fed by line wires 110 and 112. Two leads 114 and 116 are tapped into the primary intermediate its ends and these lead wires as well as line wire 112 are connected to the primary through the medium of a control member 118 having four positions, namely, an "off" position 120 and first, second and third positions 122, 124 and 126, respectively. The pump 94 is connected across line wires 110 and 112 on the transformer side of the control member 118 by means of wires 128.

The electric circuitry and hookup with the transformer and other elements is such that the speed of the pump motor 94 varies with the output of the transformer. More particularly, when the control member is set on the first position 122 and thus the output of the transformer and the tubes is less than maximum, the speed of the motor 94 is also less than maximum. When the control number 118 is set on its second position 124, however, the output of the transformer and tubes is greater and the speed of the motor 94 is also greater. When the control member 118 is set on its third position 126, there is maximum output of the transformer and maximum speed of the motor 94. The varying speed of such motor according to the setting of the control member 118 is controlled by reactance in the transformer, as is well understood in the art. The electrical system is rendered inoperative when control member 118 is turned to the off position 120.

FIGS. 6 and 7 show an arrangement wherein a support housing 128 has a fan 130 mounted thereon. The tubes 8 are supported in suitable sockets in the top of the housing and are enclosed within a screen cover 132. The housing 128, similar to the first embodiment, encloses a transformer and also includes contact means 80 and 82, not shown, for the tubes. Other portions of the circuit are identical to that illustrated in connection with FIG. 3. The control member 118 may be mounted on the housing 128 as shown in FIG. 6. Similarly such control member 118 can be mounted on the housing 50 of FIG. 3. In each of the embodiments the lower portion of the housing is sealed off so that the contact portions of the tubes and the transformer are kept dry and free of foreign matter. Also, in each of the embodiments air is drawn across the tubes rather than being blown thereacross. Pulling the air across the tubes has been found to more efficiently separate the allotropic oxygen from around the tubes. Also according to the invention the full length of conductor 118 within the tube provides for uniform operation of the tube throughout its length.

FIG. 8 illustrates another manner of securing a collar 34' on the tube portion 10. In this embodiment, the interior of the collar 34' is larger than the tube and has an upwardly tapered portion 134 at its outer end the smallest or throat portion being only slightly larger than the tube 10. The inner end of the collar has an interiorly threaded portion 136 adapted to threadedly receive a hollow nut 138 rotatably received on the tube. A resilient hollow plastic insert 140 receives the tube and is disposed within the collar and is arranged such that when forced into the tapered area 134 it is distorted to fit tightly between the tube and the collar. FIG. 8 shows the insert 140 in a position prior to fully tightening the nut 138. When the nut is fully tightened, the insert is pushed up through the taper 134 to fully surround the tube and provide a resilient but tight connection between the tube and collar and one which allows for expansion and contraction of the tube as well as to absorb mechanical shock occurring on the collar.

It is to be understood that the forms of my invention herein shown and described are to be taken as preferred examples of the same and that various changes in the shape, size and arrangement of parts may be resorted to without departing from the spirit of my invention.

Having thus described my invention, I claim:

1. A generator for producing allotropic oxygen comprising
   (a) a sealed glass tube having a gaseous filling which when subjected to high voltage is capable of producing a radiation of energy through the wall of the tube,
   (b) an elongated electrical conductor mounted lengthwise in said tube and extending axially through a major portion of said tube whereby to subject said gaseous filling to high voltage and provided with electrical communication to the exterior of the tube,
   (c) an encircling perforated grid surrounding said tube and being arranged to form a shield for energy radiating from said tube to produce allotropic oxygen,
   (d) an electric circuit including a source of electricity,
   (e) means connecting said encircling grid to said source through said electric circuit,
   (f) means connecting said electrical conductor to said source through said electric circuit,
   (g) a collar positioned coaxially on one end portion of said tube and having a surface configured to fit rigidly into a support,
   (h) and a sleeve interposed coaxially between said collar and said tube in a resilient bonded relationship to accommodate expansion and contraction.

2. The generator of claim 1 wherein said collar is electrically conductive and acts as said means for connecting said electrical conductor to said source through said electric circuit.

3. The generator of claim 1 wherein said sleeve is electrically insulative.

4. The generator of claim 1 including electrically non-conductive transverse discs in said tube holding said elongated conductor substantially centered in the tube.

References Cited

UNITED STATES PATENTS

| | | | |
|---|---|---|---|
| 1,063,167 | 5/1913 | Smith et al. | 204—320 |
| 2,326,601 | 8/1943 | Arff | 204—320 |
| 2,936,279 | 5/1960 | Rindtorff et al. | 204—320X |
| 3,442,788 | 5/1969 | Wooten et al. | 204—317 |

JOHN H. MACK, Primary Examiner

N. A. KAPLAN, Assistant Examiner

U.S. Cl. X.R.

204—321